United States Patent [19]

Springler et al.

[11] Patent Number: 4,808,420
[45] Date of Patent: * Feb. 28, 1989

[54] FRESH ROOT VEGETABLES WITH PROLONGED SHELF LIFE

[75] Inventors: John O. Springler, Plainsboro; Avigdor Orr, Highland Park; Seymour G. Gilbert, Piscataway, all of N.J.

[73] Assignee: DNA Plant Technology Corporation, Cinnaminson, N.J.

[*] Notice: The portion of the term of this patent subsequent to Jun. 2, 2004 has been disclaimed.

[21] Appl. No.: 930,503

[22] Filed: Nov. 12, 1986

Related U.S. Application Data

[63] Continuation of Ser. No. 650,776, Sep. 13, 1984, Pat. No. 4,670,275.

[51] Int. Cl.$^4$ ............................................. A23B 7/148
[52] U.S. Cl. .................................... 426/106; 426/615; 426/637
[58] Field of Search ............... 426/270, 273, 419, 615, 426/637, 302, 310, 323, 324, 412, 106, 102

[56] References Cited

U.S. PATENT DOCUMENTS

| | | | |
|---|---|---|---|
| 2,373,907 | 4/1945 | Wyelsworth | 426/520 |
| 2,427,857 | 9/1947 | Hamill | 426/310 |
| 2,515,025 | 7/1950 | Vahl et al. | 426/520 |
| 2,560,820 | 7/1951 | Recker | 426/310 |
| 3,658,559 | 4/1972 | Mohwinkel | 426/412 |
| 3,801,715 | 4/1974 | Smith | 426/520 |
| 4,001,443 | 1/1977 | Dave | 426/106 |
| 4,135,003 | 1/1978 | Mohwinkel | 426/412 |
| 4,505,937 | 3/1985 | Hudson | 426/120 |
| 4,670,275 | 6/1987 | Orr | 426/310 |

Primary Examiner—Donald E. Czaja
Assistant Examiner—Carolyn Paden
Attorney, Agent, or Firm—Pennie & Edmonds

[57] ABSTRACT

The shelf life of root crops such as raw carrots can be substantially increased by subjecting the raw carrots to a process including (a) a mild heat treatment effective to reduce the microflora of the carrots but not to adversely affect the organoleptic qualities of the raw carrots, (b) the rapid cooling of the heat treated vegetable and placing the vegetable in a sealed container to prevent microbial recontamination and maintain the vegetable in a viable condition.

2 Claims, No Drawings

FRESH ROOT VEGETABLES WITH PROLONGED SHELF LIFE

This is a continuation of co-pending application Ser. No. 650,776, filed on Sept. 13, 1984, now U.S. Pat. No. 4,670,275.

BACKGROUND OF THE INVENTION

1. Field of the Invention

This invention relates to a process for prolonging the shelf life of fresh vegetables. More particularly, it relates to prolonging the shelf life of fresh root crops. This invention especially relates to prolonging the shelf life of carrots by a process which includes a hot water treatment, a cooling step and a packaging operation.

2. Description of the Prior Art

Fresh fruits and vegetables are extremely perishable commodities. Heretofore many techniques have been employed to protect such food products from oxidative degradation, mold attack and moisture penetration and to preserve the freshness, texture and color of the fresh produce. One of the earliest means of lengthening the shelf life of fruits and vegetables was refrigeration. However, most fresh produce when stored under reduced temperatures for prolonged periods shows adverse effects on the taste, odor or quality of the product from microbial and mold growth above 35° C. In addition, storage temperatures below 35° C. often show chill injury to the tissue of the produce. Hence, in many instances refrigeration alone is not effective in achieving the desired shelf life for a particular fruit or vegetable.

Coating fresh fruits and/or vegetables is another of these techniques which has been employed with varying degrees of success. Not only must the coating be effective in prolonging the useful shelf life of the fresh product, but the appearance of the commodity must not be altered from that of its natural state. At a minimum, this natural appearance must not only remain unchanged but should ideally be enhanced especially when the fruit or vegetable will be displayed for sale. The selection of a coating material is further complicated where the fruit or vegetable is to be consumed in its natural state and it is considered essential that there be no need to remove the coating. In that event, the coating material must not only be edible, it must not affect or alter the natural organoleptic characteristics of the fresh fruit or vegetable.

Typical of these prior art coatings are the wax emulsions of U.S. Pat. Nos. 2,560,820 of Recker and 2,703,760 of Cunning. Coatings of natural materials have been employed including milk whey (U.S. Pat. No. 2,282,801 of Musher), lecithin (U.S. Pat. Nos. 2,470,281 of Allingham and 3,451,826 of Mulder), gelatin together with polyhydric alcohol (U.S. Pat. No. 3,556,814 of Whitman et al.) and protein (U.S. Pat. No. 4,344,971 of Garbutt). Polymers have also been used extensively, viz., a thermoplastic polymer (U.S. Pat. No. 2,213,557 of Tisdale et al.), vinyl acetate polymer (U.S. Pat. No. 3,410,696 of Rosenfield), a hydrophilic polymer (U.S. Pat. No. 3,669,691 of De Long et al.) and the combination of a water soluble polymer and a hydrophobic material (U.S. Pat. No. 3,997,674 of Ukai et al.). Cellulostic materials have found utility in coating fruits and vegetables including hydrated cellulose (U.S. Pat. No. 1,774,866 of Beadle), a combination of cellulose and wax (U.S. Pat. No. 2,364,614 of Beatty), cellulose ether in combination with a fatty acid ester (U.S. Pat. No. 3,471,303 of Hamdy et al.) or monoglyceride and a fatty acid metal salt (U.S. Pat. No. 3,461,304 of Hamdy et al.), or a sucrose ester of a fatty acid (U.S. Pat. No. 4,338,342 of Tan et al.)

Food preservation has for many years employed such mutually exclusive processes as dehydration and freezing. Both of these operations often include a heat treatment, known as blanching, which is conducted prior to the dehydration or freezing step. Blanching is said to reduce enzyme or bacteria level and to prevent or minimize undesirable changes during storage in the dry or frozen state, such as changes in color, odor or texture or loss of vitamins. Blanching may be conducted with steam (e.g., U.S. Pat. No. 2,373,521 of Wigelsworth), hot water (U.S. Pat. No. 2,515,025 of Vahl et al.), hot oxygen-free gas (U.S. Pat. No. 3,801,715 of Smith et al.) or hot air (U.S. Pat. No. 3,973,047 of Linaberry et al.)

U.S. Pat. No. 2,780,551 of Guadagni is also concerned with the preservation of raw fruits or vegetables by freezing. A heat pretreatment is employed here also, but it is a mild heat treatment to cause partial enzyme inactivation. The mild heat treatment may be conducted by immersing the food in a liquid which is heated to a temperature in the range of 150° to 212° C. for a period of from about 10 seconds at the higher temperatures to about 10 minutes at the lower temperatures. The heat treatment is described as heating the food at a temperature and for a period of time sufficient to inactivate the enzymes in the surface layers of the food but not the enzymes throughout the food and not sufficient to sterilize or cook the food. The combination of mild heat treatment and freezing produces a product which will maintain its fresh color, taste and appearance after prolonged storage.

U.S. Pat. No. 2,619,424 of Masure discloses a process for preparing dehydrated carrots having improved storage qualities. The carrots are dehydrated, then moistened with water, optionally containing starch, and then the carrots are dehydrated to a moisture level below about 10%. The use of starch assists in preserving the color of the final product although the absorbed water is the primary factor in improving the stability of the color and the carotene content.

It is an object of this invention to prolong the post harvest life of the fresh root crops.

It is another object of this invention to improve the shelf life of fresh carrots.

It is a further object of this invention to provide raw carrots in a ready-to-eat form and to improve the shelf life of these fresh carrots.

SUMMARY OF THE INVENTION

These and other objects are achieved by subjecting the raw root vegetable to a mild heat treatment and a cooling treatment and then sealing the vegetable in a container.

In particular, this invention concerns a process of maintaining a fresh root vegetable in a viable form which comprises:
(a) subjecting a fresh root vegetable to elevated temperature and time conditions effective to reduce the microflora concentration in colony forming units (CFU)/g greater than $10^2$ while substantially maintaining the sensory qualities of color, taste and texture of the fresh root vegetable, (b) rapidly cooling the heat treated vegetable to below about 25° C. in less than about two minutes, and (c) providing the vegetables in a sealed container effective to prevent microbial recontamination of the vegetable and having a gas permeability effective to maintain the vegetable in a viable condition.

DESCRIPTION OF THE PREFERRED EMBODIMENTS

The present invention relates to a process of improving the useful shelf life of fresh vegetables, particularly root vegetables, especially carrots. The invention also relates to the vegetable produced by this process. In one embodiment this invention relates to carrots prepared as a ready-to-eat raw snack food and provided in a package which may be stored for a period substantially longer than raw fresh carrots which have not been treated by the process of the present invention. Carrots provided in this fashion are ideal for use with party dips or for inclusion in a lunch box or a picnic basket since they require no preparation and can be served or eaten "right out of the package."

The basic purpose of the process of this invention is to reduce the endogenous microflora present in a raw fresh root vegetable while maintaining the vegetable in a viable form and without undue damage to the vegetable cell tissue so that when it is subsequently eaten, it will provide substantially the same sensory qualities of appearance, odor and taste as the freshly harvested raw vegetable. Without treatment in accordance with this invention, the growth of microflora in the fresh vegetable will in a short time adversely affect the organoleptic qualities of the vegetable even if stored under refrigeration. By practicing the process of the present invention, the useful shelf life of fresh carrots, for example, can be prolonged by about 14 to about 21 days at a 10° C. storage temperature.

The vegetables which are particularly adapted to the process of the present invention are those which are known collectively as root vegetables or root crops, particularly those which are eaten in the raw state. These vegetables include carrots, turnips, rutabaga and radishes. Carrots are especially well suited to being treated in accordance with the present invention which will be explained below using carrots as the vegetable being processed. This is done for illustration purposes and although carrots are especially preferred when practicing this invention, other root crops, as explained above, may be employed.

In accordance with the present invention, the carrots are subjected to a mild heat treatment to substantially reduce the microflora content then are rapidly cooled and finally are placed in a sealed container.

In most instances the carrots will be provided in a condition whereby the consumer can eat the carrots without any preparation. Thus, before the carrots are shipped to the processing plant to be treated in accordance with the present invention, the harvested carrots should be topped to remove the green leafy top and washed to remove the soil from the exterior surface of the carrots. This can be performed in the field during harvesting or just prior to shipping to the processing and packaging plant. The preparation continues at the plant with peeling of the carrots which may be achieved by any of several known methods:

(a) steam peeling using a batch type peeler such as an Odenberg peeler, K & K Model 100 or an FMC continuous peeler, (b) lye peeling using a peeler such as an A. K. Robins ferris wheel type employing a lye concentration of 5–20%, or (c) mechanical peeling using an interchangeable roller type peeler such as a Magnason Model HL. The peels can be removed from the carrots by employing equipment such as an A. K. Robins drum washer or a Magnason Magnu washer with stud rubber and brush rolls.

Since the carrots are to be provided in a ready-to-eat form, the carrots should be of a small diameter variety which are cut to the desired length, usually 3–5 inches. For larger diameter carrots, they should be cut to provide carrot sticks of about 3–5 inches in length and a cross section of about $\frac{1}{4}$–178 inch by $\frac{1}{4}$–$\frac{1}{2}$ inch.

In the practice of this invention, the initial step is a mild heat treatment. The mild heat treatment must be conducted at a temperature and for a period of time which are effective to reduce the endogenous microflora without causing undue damage to carrot cell tissue which could affect the sensory qualities of a fresh, raw carrot. Excessive heat treatment causes the carrots to have a cooked appearance and taste and to suffer a loss of turgor, i.e., the ability to hold water. In contradistinction, insufficient heat treatment results in no appreciable and consistent reduction of microflora. To be effective, the treatment must cause a reduction of microflora count of at least $10^2$, preferably at least $10^4$. It is possible when practicing the heat treatment of this invention to reduce the microflora level to below about 3 colony forming units (CFU) per gram of carrots. In one embodiment of the heat treatment, the carrots are immersed for about 30 to about 180 seconds in water maintained at about 45 to about 55° C. Those skilled in the art can determine the optimum conditions for particular carrots without an undue amount of experimentation by evaluating the microflora count before and after a series of heat treatment screening tests. Not only must the heat treatment cause the required reduction in microflora, but the carrots must maintain the organoleptic qualities of odor, appearance, taste and mouth feel evidenced by freshly harvested raw carrots.

The next step involves a rapid cooling of the heat treated carrots. The rapid cooling is necessary to minimize surface cell heat destruction and reduce enzymatic activity which adversely affect color, odor, taste and texture. As the carrots are removed from the heat treating step, they are rapidly cooled to below about 25° C., preferably below about 15° C. in less than about 2 minutes. This cooling may be accomplished in various ways, including spraying the carrots with cold water, immersing them in cool water, passing cold air over the carrots, or the like. Other cooling methods known in the art may also be used instead of or in conjunction with any of these cooling methods. In one preferred embodiment, the rapid cooling is achieved by immersing the carrots in cold water, preferably chlorinated (10–15 ppm). In another preferred embodiment the carrots are subjected to vacuum cooling to achieve the required rapid cooling.

The heat treated and cooled carrots are now ready for the final operation of packaging. The carrots are placed in a sealed package to prevent undue moisture loss as measured by texture and to prevent microbial recontamination. The packaging material should have a gas permeability effective to permit sufficient respiration for maintaining the carrot tissue in a viable condition. Typically, useful packaging films should have a permeability of about 75 to about 200 cc of $O_2$/100 $in^2$-atm.-24 hrs. and about 400 to about 600 cc of $CO_2$/100 $in^2$-atm.-24 hrs. and a moisture transmission rate of less than 1.0 g/100 $in^2$-atm.-24 hrs. Further, the ratio of product mass to package surface should be in the range of about 1 to about 6 $g/in^2$. Packages can be made from flexible or semi-rigid materials in various shapes and forms including three sided pouches and thermoformed tubs to provide an attractive, eye-catching package. Foamed polypropylene has been found to be useful packaging material in the practice of this invention.

For maximum shelf life, the packaged carrots should be maintained under refrigeration at a temperature of above 2 to below 15° C., preferably about 2 to about 4° C. Packaged carrots prepared in accordance with the process of this invention have a shelf life of about 14 to about 21 days longer than packaged carrots which have not been similarly processed.

Although, the heat treating, cooling and packaging of the carrots in accordance with this invention significantly improves the shelf life of the fresh carrots, several other optional steps may be included in the process of this invention to further enhance the shelf life and/or the appearance of the carrots.

Thus, following the rapid cooling of the carrots by any of the methods described above, the carrots are preferably subjected to a vacuum in the range of about 1 to about 12 inches Hg absolute for about two to about ten minutes in the presence or absence of water, which may optionally be chlorinated. The vacuum should be broken in the presence of water, preferably chlorinated. This may be accomplished by having the carrots immersed in water or by spraying water over the carrots when the vacuum is broken. Ideally, this use of vacuum can be accomplished in conjunction with a vacuum cooling which is one of the preferred cooling techniques. Breaking the vacuum in the presence of water significantly improves the color of the carrot pieces in that the color looks brighter and deeper as compared to carrot pieces not so treated. This is thought to be caused by the removal of inter and intra cellular gases and replacing them with water. Employing chlorinated water here will provide an additional benefit in that the initial microflora will be further reduced, further prolonging shelf life. Breaking the vacuum with chlorinated water when used in combination with the hot water heat treatment provides a synergestic improvement.

Since the cooled carrots may contain surface water after they are cooled and, optionally, subjected to vacuum conditions, this water should be removed before the carrots are further processed. Any of several known techniques can be employed, such as, centrifuging or contacting with dry air at temperatures of about 10 to about 20° C. or the like.

In another optional embodiment the heat treated and cooled carrots may be provided with a coating before they are placed in the sealed protective package. This coating controls the state of water at the carrot's surface. It also acts as a partial barrier to oxygen and carbon dioxide exchange thus further slowing biochemical reactions and prolonging shelf life. Since, ideally, the coating will be consumed when the carrots are eaten, the coating material selected should not only be edible, it must not adversely affect the natural taste of raw carrots. Further, the coating material should enhance the surface appearance of the carrots when they are displayed for sale. Previous studies have determined that microorganisms do not grow in an environment of restricted water availability and some consider that the partial pressure of the water vapor, in equilibrium with the growth media, such as a food product, is the criterion of the water availability. It now appears that this criterion is the thermodynamic state of the water rather than the equilibrium relative humidity. More specifically, the relative humidity is related to the average fugacity or escaping tendency of water. Bacteria, on the other hand, grow only in the presence of water which is associated with other water molecules, i.e., clustered water, rather than in the presence of water associated with a single polar bonding site on macromolecules, i.e., bound water. Macromolecules such as hydrocolloids are ideally suited for use as a coating material, provided they meet the organoleptic standards as well. Hydrocolloids such as microcrystalline cellulose or modified tapioca starch are particularly preferred. Typically coatings of these materials constitute about 0.05 to about 1.0 of the weight of the carrot. The hydrocolloids must be effective in regulating the availability of water at the surface of the carrots. The hydrocolloids can also slow down the permeation of oxygen from the environment into the carrot tissue and the permeation of carbon dioxide from the tissue into the surrounding environment.

The following examples illustrate the practice of the invention.

EXAMPLE I

The effect of hot water treatment on the initial aerobic microbial count of fresh carrots was evaluated.

A number of fresh carrots were washed, peeled and cut into 3"×⅜"×⅜" sticks. The carrot sticks were subjected to various hot water treatments, and then the initial aerobic microbial count of the treated carrots in terms of colony forming units (CFU) per gram was measured.

The various treatments and the results are shown in Table I below. These data indicate that the appearance and taste of fresh carrots can be substantially retained when subjecting the carrots to hot water treatment while significantly reducing the surface microbial count.

TABLE I

| The Effect of Hot Water Treatment on Initial Aerobic Microbial Count of Fresh Carrots | | |
|---|---|---|
| Description | Initial C.F.U./gram | Initial Observation |
| Fresh Prepared Carrots No Hot Water Treatment | $3.0 \times 10^4$ | Semi-dry surface, good flavor Medium-high rigidity, light orange color |
| Agitated Water @ 45° C. | $1.0 \times 10^3$ | Medium rigidity, good flavor |

TABLE I-continued

The Effect of Hot Water Treatment on
Initial Aerobic Microbial Count of Fresh Carrots

| Description | Initial C.F.U./gram | Initial Observation |
|---|---|---|
| Immersion time: 1 minute | | and texture, slightly moist surface |
| Agitated Water @ 45° C. Immersion time: 3 minutes | $3.0 \times 10^2$ | Medium rigidity, slight flavor loss, moist surface, color not as intense as with higher temperature |
| Agitated Water @ 55° C. Immersion time: 1 minute | <3 | Medium rigidity, good carrot flavor, slightly moist orange surface |
| Agitated Water @ 55° C. Immersion time: 3 minutes | <3 | Medium to soft rigidity, slight cooked taste, some flavor loss, orange moist surface |
| Agitated Water @ 60° C. Immersion time: 3 minutes | <3 | Soft, rubbery texture, cooked flavor, good orange color |
| Agitated Water @ 65° C. Immersion time: 1 minute | <3 | Medium rigidity, slight cooked flavor, orange moist surface |
| Agitated Water @ 65° C. Immersion time: 3 minutes | <3 | Soft, rubbery texture, cooked flavor, orange moist surface |
| Agitated Water @ 70° C. Immersion time: 0.50 minutes | <3 | Medium rigidity, moist orange surface, slight flavor loss |
| Agitated Water @ 70° C. Immersion time: 0.75 minutes | <3 | Medium to soft rigidity, moist orange surface, flavor loss more extensive |

EXAMPLE II

The effect of hydrophilic polymer on the shelf-stability of hot water treated carrots was evaluated.

A number of carrots were prepared in stick form as in Example I and where then subjected to a series of hot water treatments and polymer coatings. After the treated carrots were stored for 13 days, the microbial count of each sample was measured.

A description of the various treatments and the results of the evaluation are shown in Table II below. These data indicate that a coating of a hydrophilic polymer can significantly improve the storage stability of fresh carrots which have been treated with hot water to reduce the microflora content of the carrots.

TABLE II

The Effect of Hydrophilic Polymers on
The Shelf-Stability of Hot Water Treated Fresh Carrots

| Description | Colony Forming Units per gram After Storage |
|---|---|
| Control Agitated Water @ 55° C. Immersion time: 2.5 minutes | $>4.0 \times 10^{10}$ |
| Agitated Water @ 55° C. Immersion time: 2.5 minutes Polymer/Usage: 0.05% Microcrystalline Cellulose | $2.2 \times 10^8$ |
| Agitated Water @ 55° C. Immersion time: 2.5 minutes Polymer/Usage: 0.1% Microcrystalline Cellulose | $1.4 \times 10^9$ |
| Agitated Water @ 55° C. Immersion time: 2.5 minutes Polymer/Usage: 0.2% Microcrystalline Cellulose | $1.0 \times 10^8$ |
| Agitated Water @ 55° C. Immersion time: 2.5 minutes Polymer/Usage: 0.2% Tapioca Starch | $<2.0 \times 10^9$ |

EXAMPLE III

The effect of hot water treatment and vacuum on the storage stability of carrots was evaluated.

A number of fresh carrots were prepared in stick form as in Example I and were then subjected to various combinations of hot water treatment and vacuum. The microbial count of the treated carrots was measured immediately after the various treatments and again after prolonged storage which ranged from 15 to 27 days.

A description of the various treatments and the results of the evaluation are presented in Table III. These data indicate that the combination of hot water treatment and vacuum have a synergistic effect in controlling microbial growth in fresh carrots.

TABLE III

The Synergistic Affect of Hot Water Treatment
and Vacuum in Controlling Microbial Growth

| Description | Initial C.F.U./gram | Storage Time (Days) | C.P.U./gram $<10^{13}$ |
|---|---|---|---|
| Fresh prepared carrots | $3.7 \times 10^4$ | 15 days | $5.8 \times 10^{13}$ |
| Chlorinated Water soak 5 minutes (50-100 ppm) | $3 \times 10^3$ | 15 | $2.5 \times 10^{13}$ |
| Chlorinated Water Soak 5 minutes (50-100 ppm) Vacuum 28" Hg for 5 minutes | $1.6 \times 10^3$ | 17 | $3.1 \times 10^{12}$ |
| Hot Water Treatment 55° C. for 2 minutes | $<3.9 \times 10^2$ | 15 | $8.2 \times 10^{15}$ |
| Hot Water Treatment 55° C. for 2 minutes Vacuum 28" Hg for 5 minutes | Neg. | 27 | $8.7 \times 10^{11}$ |

What is claimed is:

1. The product prepared by a process for maintaining a fresh root vegetable in viable form which comprises:
   (a) peeling the surface of a fresh root vegetable having endogenous microflora present therein,
   (b) providing the vegetable in uniform sized pieces,
   (c) subjecting the vegetable having endogenous microflora present therein to elevated temperature and time conditions effective to reduce the endogenous microflora concentration in colony forming units (CFU)/g by a factor greater than $10^2$ while maintaining the vegetable in a viable form and substantially maintaining the sensory qualities of color, taste and texture of the fresh root vegetable, (d) rapidly cooling the heat treated vegetable to below about 25° C. in less than about two minutes, (e) subjecting the vegetable to a vacuum of about 1 to about 12 inches Hg absolute for about 2 to about 10 minutes, (f) breaking the vacuum in the presence of water, (g) removing surface water from the vegetable, and (h) providing the vegetable in a sealed container effective to prevent microbial recontamination of the vegetable and having a gas permeability effective to maintain the vegetable in a viable condition, wherein the vegetable is a carrot.

2. The product of claim 1 wherein the following step is conducted after step (g) and before step (h):

providing a coating of microcrystalline cellulose or modified tapioca starch on the rapidly cooled, heat treated fresh root vegetable, said coating being about 0.05 to about 1 wt. % of the vegetable weight.

* * * * *

UNITED STATES PATENT AND TRADEMARK OFFICE
CERTIFICATE OF CORRECTION

PATENT NO. : 4,808,420
DATED : February 28, 1989
INVENTOR(S) : Spingler et al.

It is certified that error appears in the above-identified patent and that said Letters Patent is hereby corrected as shown below:

Cover page, directly under the term United States Patent, delete "Springler" and insert therefor --Spingler--. Also, on the cover page in the left column, on the first line of the section designated [75], delete "Springler" and insert therefor --Spingler--.

Signed and Sealed this

Ninth Day of January, 1990

*Attest:*

JEFFREY M. SAMUELS

*Attesting Officer*   *Acting Commissioner of Patents and Trademarks*